United States Patent [19]
Booy

[11] Patent Number: 5,832,607
[45] Date of Patent: Nov. 10, 1998

[54] METHOD OF MAKING A TRANSMISSION SHAFT

[75] Inventor: Daryl R. Booy, Ceresco, Mich.

[73] Assignee: Eaton Corporation, Cleveland, Ohio

[21] Appl. No.: 909,214

[22] Filed: Aug. 11, 1997

Related U.S. Application Data

[62] Division of Ser. No. 695,116, Aug. 5, 1996.

[51] Int. Cl.[6] .................................................. B21K 1/10
[52] U.S. Cl. .............. 29/893.34; 29/893.3; 29/DIG. 48; 74/375
[58] Field of Search ................... 29/893, 893.3, 29/893.34, DIG. 48; 74/375; 464/179, 183

[56] References Cited

U.S. PATENT DOCUMENTS

| | | | |
|---|---|---|---|
| 4,205,925 | 6/1980 | Fisher . | |
| 4,421,497 | 12/1983 | Federmanin et al. | 464/181 |
| 4,518,370 | 5/1985 | Orain . | |
| 4,659,005 | 4/1987 | Spindler | 29/DIG. 48 |
| 4,711,008 | 12/1987 | Nakamura | 29/DIG. 48 |
| 4,733,814 | 3/1988 | Penman | 228/2 |
| 5,390,561 | 2/1995 | Stine | 74/331 |
| 5,546,823 | 8/1996 | Stine et al. | 74/331 |

FOREIGN PATENT DOCUMENTS 55-163311  12/1980  Japan .................................... 464/179

*Primary Examiner*—P. W. Echols
*Attorney, Agent, or Firm*—Howard D. Gordon

[57] ABSTRACT

An elongated shaft (124) for a compound transmission (110) and a method for producing same is provided. The shaft is finish machined from a work piece (200) comprising three segments (204, 206, 208) joined at friction-welded joints (210, 212).

8 Claims, 3 Drawing Sheets

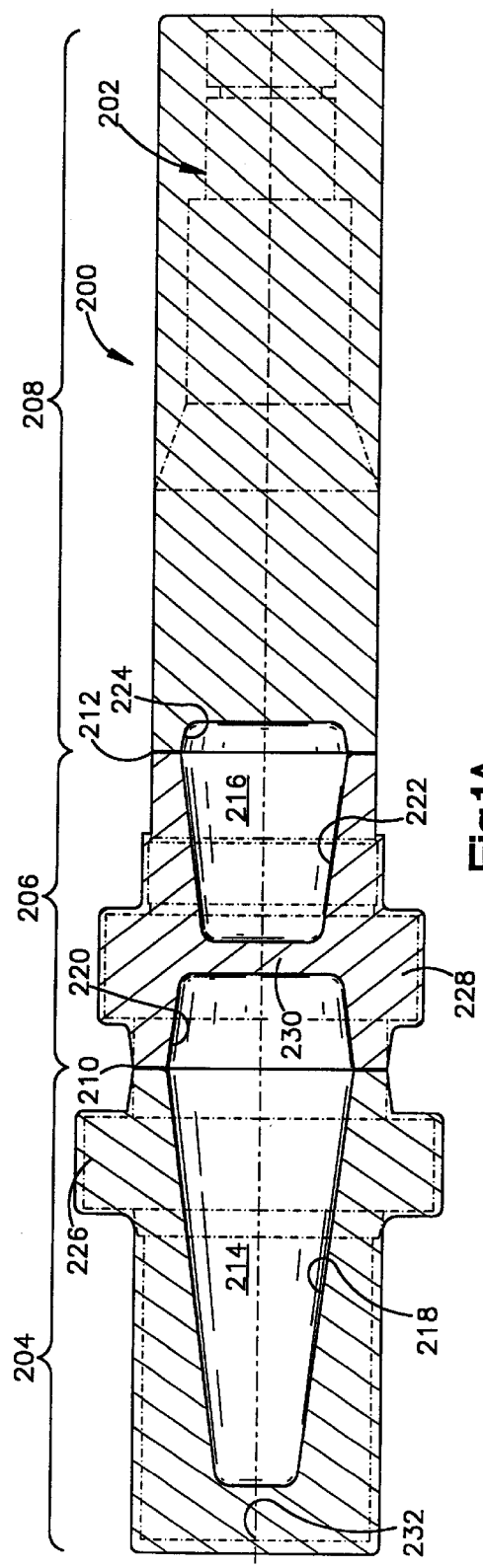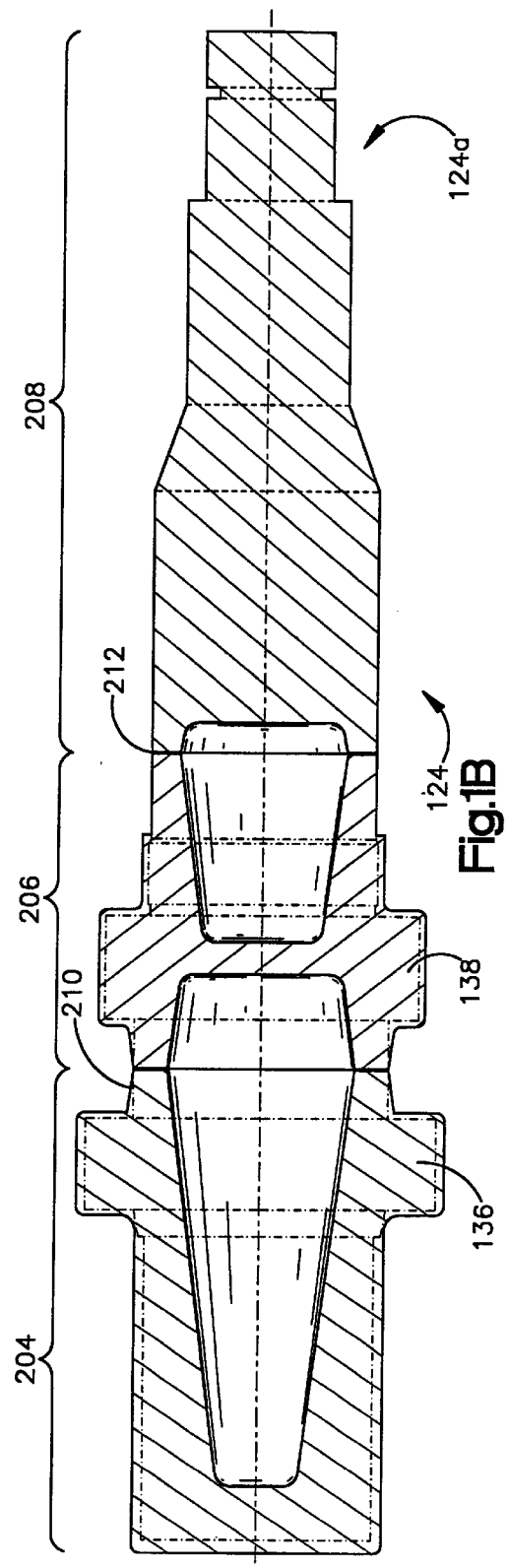

METHOD OF MAKING A TRANSMISSION SHAFT

This is a divisional of copending application Ser. No. 08/695,116 filed on Aug. 5, 1996.

BACKGROUND OF THE INVENTION

1. Field of the Invention

The present invention relates to transmission shafts and a method for producing same. In particular, the present invention relates to elongated shafts, such as transmission countershafts, and a method of producing same involving friction or inertia welding of forged segments which are optimized for weight reduction, material cost and/or required strength.

2. Description of the Prior Art

Heavy-duty transmissions and the shafts utilized therein are well known in the prior art, as may be seen by reference to U.S. Pat. Nos. 3,105,395; 4,754,665 and 4,944,197, the disclosures of which are incorporated herein by reference. Such transmissions typically utilize countershafts machined from one-piece solid forgings and define one or more gears, typically the gears associated with the low and/or reverse ratios, integral therewith.

A more recent compound transmission design utilizes an increasingly elongated countershaft which extends from the forward to the rear housing walls (see U.S. Pat. No. 5,390,561, the disclosure of which is incorporated herein by reference).

The prior art shafts and the method of producing same involved machining of a one-piece solid cold forging which, especially for an elongated countershaft, was not totally satisfactory, as the shaft was more expensive to produce and/or heavier than desired.

SUMMARY OF THE INVENTION

In accordance with the present invention, the drawbacks of the prior art are minimized or overcome by the provision of a structure and manufacturing method for an elongated shaft which will result in a less expensive and lighter weight shaft as compared to the prior art transmission shaft structures and manufacturing methods.

The foregoing is accomplished by providing a structure for an elongated shaft work piece comprising at least one hot forged segment having a cup-shaped cavity at one or both of its ends which is welded, preferably by inertia or friction welding, to a similar hot forged segment or to a bar stock segment. The welded segments define a hollowed-out work piece which is then finish machined and/or heat and/or surface treated to complete production of the shaft. The hot forged segment (or segments) is configured to provide optimized weight reduction and required strength of the assembled shaft. As the strength requirements for the various segments may differ, the most cost-effective material for each segment may be individually selected.

Accordingly, it is an object of the present invention to provide a new and improved structure and manufacturing method for an elongated transmission shaft.

This and other objects and advantages of the present invention will become apparent from a reading of the following description of the preferred embodiment taken in connection with the attached drawings.

BRIEF DESCRIPTION OF THE DRAWINGS

FIG. 1A is a plan view, in section, of the welded work piece from which the transmission elongated countershaft of the present invention is machined.

FIG. 1B is a plan view of the transmission elongated countershaft of the present invention.

DESCRIPTION OF THE PREFERRED EMBODIMENT

Figure 2:
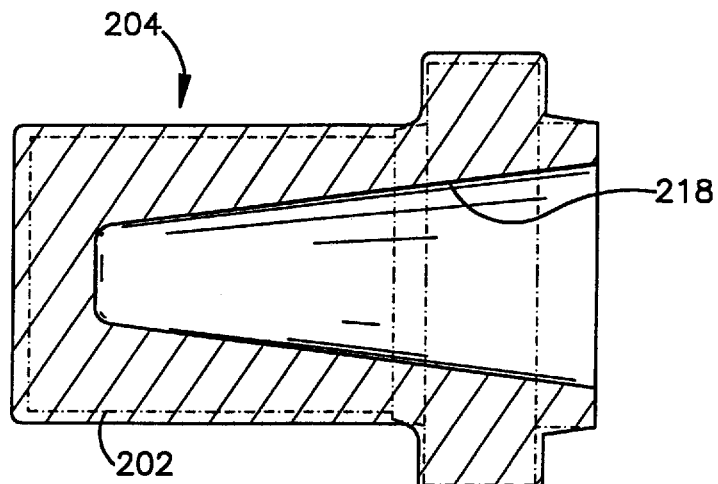
FIG. 2 is a sectional view of a first forged segment.
Figure 3:
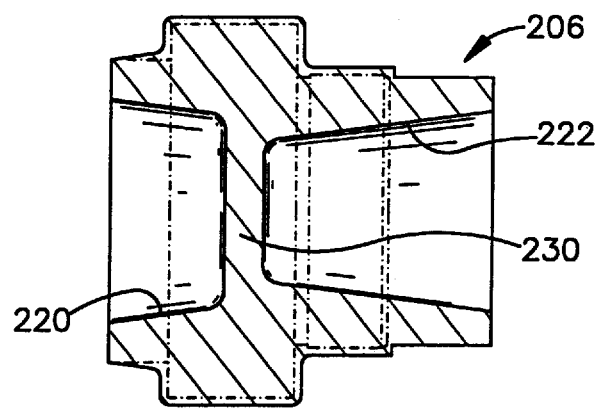
FIG. 3 is a sectional view of a second forged segment.
Figure 4:
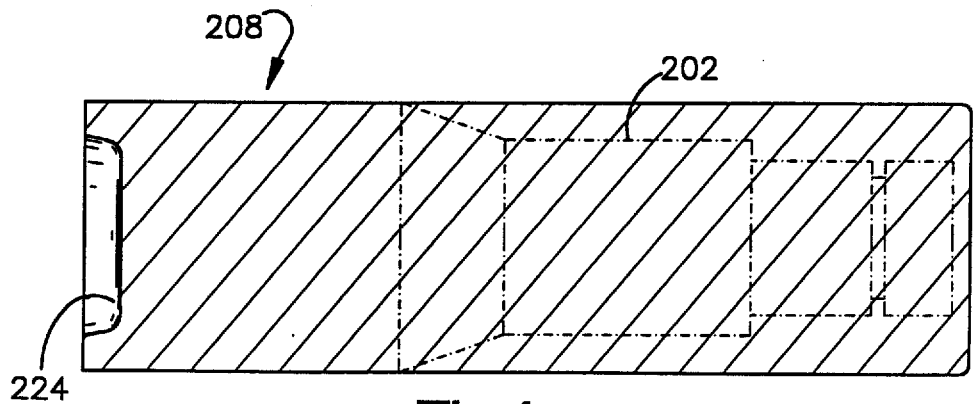
FIG. 4 is a sectional view of a third bar stock segment.
Figure 5:
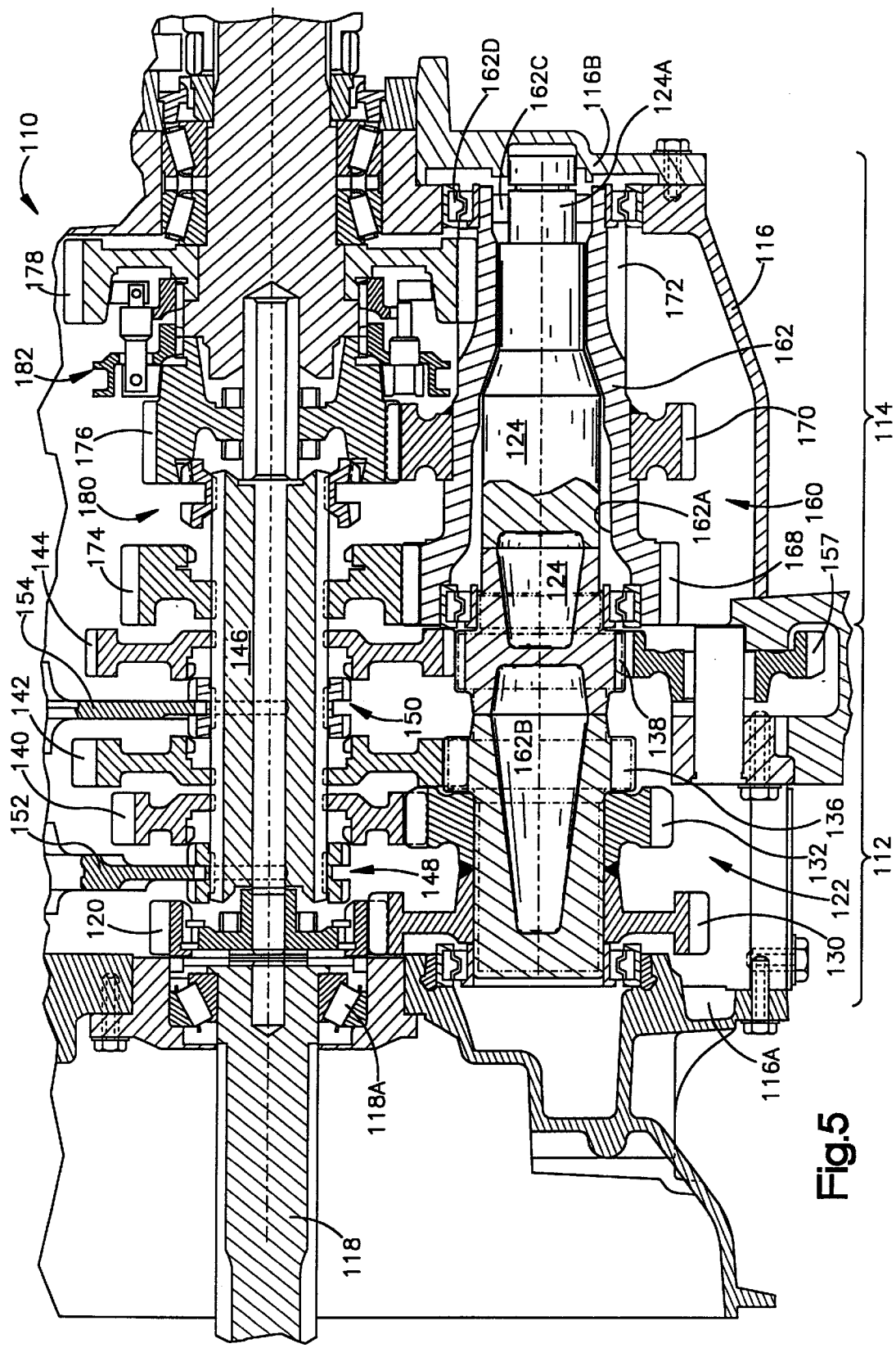
FIG. 5 is a sectional view of a heavy-duty vehicular transmission utilizing the elongated front or main section countershaft of the present invention.

Certain terminology will be used in the following description of the preferred embodiment for convenience only and will not be limiting. The terms "upwardly," "downwardly," "rightwardly" and "leftwardly" will designate directions in the drawings to which reference is made. The terms "forward" and "rearward" will refer, respectively, to the front and rear ends of the drive train components as conventionally mounted in the vehicle, being, respectively, to the left and right sides of the various drive train components, as illustrated in FIG. 5. The words "inwardly" and "outwardly" will refer, respectively, to directions toward and away from the geometric center of the device and designated parts thereof. Said terminology includes the words above specifically mentioned, derivatives thereof and words of similar import.

FIG. 5 illustrates a compound heavy-duty vehicular transmission 110 of the type advantageously utilizing the increasingly elongated front or main section countershaft 124 of the present invention. A detailed description of transmission 110 may be seen by reference to aforementioned U.S. Pat. No. 5,390,561.

Transmission 110 includes a mainsection 112 and an auxiliary section 114, both contained within housing 116. Housing 116 includes a forward end wall 116A and a rearward end wall 116B, but not an intermediate wall.

Input shaft 118 carries input gear 120 fixed for rotation therewith and is supported by bearing 118A. The mainshaft 146 carries mainshaft clutches 148 and 150 and the mainshaft splitter clutch 180 and is supported by the input shaft 118 and the output shaft 158. Shift forks 152 and 154 are provided for shifting clutches 148 and 150, respectively. Mainshaft 146 is independently rotatable relative to input shaft 118 and output shaft 158 and preferably is free for limited radial movements relative thereto.

The main section 112 includes two substantially identical main section countershaft assemblies 122 each comprising an elongated main section countershaft 124 carrying countershaft gears 130, 132, 134, 136 and 138 fixed thereto. Gear pairs 130, 134, 136 and 138 are constantly meshed with input gear 118, mainshaft gears 140 and 142 and idler 157, which is meshed with reverse mainshaft gear 144, respectively. It is noted that, in the preferred design, countershaft gears 136 and/or 138 are formed integrally on shaft 124.

Mainsection countershaft 124 extends rearwardly into the auxiliary section, where its rearward end 124A is supported directly or indirectly in rear housing end wall 116B.

The auxiliary section 114 includes two substantially identical auxiliary countershaft assemblies 160, each including an auxiliary countershaft 162 carrying auxiliary countershaft gears 168, 170 and 172 for rotation therewith. Auxiliary countershaft gear pairs 168, 170 and 172 are constantly meshed with splitter gear 174, splitter/range gear 176 and range gear 178, respectively. Splitter clutch 180 is fixed to mainshaft 146 for selectively clutching either gear 174 or 176 thereto, while synchronized range clutch 182 is fixed to output shaft 158 for selectively clutching either gear 176 or gear 178 thereto.

Auxiliary countershafts 162 are generally tubular in shape defining a through bore 162A for receipt of the rearward extensions of the main section countershafts 124. Bearings or bushings 162B and 162C are provided to rotatably support auxiliary countershaft 162 on main section countershaft 124. Bearing 162D directly or indirectly supports the rear ends of countershafts 124 and 162 in the rear end wall 116B.

The use of the elongated front or main section countershaft 124 with the auxiliary section countershafts telescopically supported thereon allows for the elimination or minimization of intermediate walls and, for a comparable capacity, a considerably shorter and/or lighter transmission. See aforementioned U.S. Pat. No. 5,390,561 and copending U.S. Pat. application Ser. No. 08/345,092, now U.S. Pat. No. 5,546,823 entitled HIGH-CAPACITY COMPOUND TRANSMISSION and assigned to EATON CORPORATION, the assignee of this application, the disclosures of which are incorporated herein by reference.

Due to the considerable length (about 18.9 inches or 48.0 centimeters with an outer diameter of about 2.6 to 4.5 inches or 7.0 to 11.3 centimeters) of elongated main section countershaft 124, producing same in the traditional manner (i.e., machining the shaft from a one-piece solid cold forged forging) results in a shaft that is heavier and more expensive than desired.

Referring to FIGS. 1A–4, the work piece 200, from which the elongated main section countershaft 124 is machined, may be seen. In FIG. 1A, the phantom line 202 illustrates the final machined form of countershaft 124. The work piece 200 is formed from a first hot forged segment 204, a second hot forged segment 206, and a third bar stock segment 208. The segments 204, 206 and 208 are individually illustrated in FIGS. 2, 3 and 4, respectively.

The first and second segments 204 and 206 are joined at weld joint 210, while the second and third segments 206 and 208 are joined at weld joint 212. The welded joints preferably are done by the so-called "friction welding" or "inertia welding" process. In this process, one of the segments is caused to rotate rapidly relative to the other segment and then the segments are moved axially into sustained forced contact. This welding process, and acceptable modifications and alternatives, are well known in the art.

The segments 204, 206 and 208 preferably are of a typical shaft or gear grade of steel commonly used in heavy-duty transmissions such as, for example, SAE 8620H, SAE 4120RH, SAE 8627H, SAE 4130RH, SAE PS 18, SAE 4130, SAE 4817H or SAE 4817RH. Segments 204 and 206 preferably are of a relatively short length relative to their diameter, allowing production by a common hot forging process, which is less expensive than a cold forging process required to forge the work piece for shaft 124 as a single forging.

The friction or inertia welding process allows joining of segments of different alloys and, thus, each individual segment may be of a material selected to maximize the strength and material cost considerations thereof. By way of example, the requirements of segments 204 and 208 may be less than for segment 206, allowing a more costly alloy to be utilized for only segment 206, rather than for the entire shaft, as would be required if shaft 124 was of the prior art structure produced by the prior art methods.

Although friction welding is the preferred method of joining the segments, other forms of joining the segments are possible within the scope of the present invention, such as, by way of non-limiting example, other forms of welding or adhesives.

As may be seen by reference to FIGS. 1A and 1B, work piece 200 and shaft 124 define two enclosed internal cavities 214 and 216, which considerably reduce the weight and material cost of shaft 124 as compared to the prior art solid structures. As may be seen, internal cavity 214 is defined by rearwardly opening cavity 218 in the first segment 204 and forwardly opening cavity 220 in the second segment 206. Internal cavity 216 is defined by rearwardly opening cavity 222 in the second segment 206 and a shallow forwardly opening cavity 224 in the third segment 208. The specific shapes and locations of the cavities are selected in view of maximizing weight and material savings while retaining required shaft strength and durability and preserving ease of forging and welding.

First segment 204 is provided with an enlarged flanged area 226 for formation of the external gear teeth to define countershaft gear 136, while the second segment 206 is provided with an enlarged flanged area 228 for formation of the external gear teeth to define countershaft gear 138. The rib 230 separating the cavities 220 and 222 in the second segment 206 is axially aligned with flanged area 228.

The internal and external dimensions of the various segments, and of the assembled work piece 200, are symmetrical about the axis of rotation 232 of the shaft 124.

After forging of the segments and required intermediate machining, if any, the work piece 200 is assembled by welding. After assembly of the work piece, the work piece is machined and heat and surface treated to its final configuration for assembly as main section countershaft 124 into transmission 110.

Accordingly, it may be seen that a new and improved elongated transmission shaft structure and method for producing same is provided which will minimize or eliminate the drawbacks of the prior art.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for providing an elongated transmission shaft comprising:

providing by forging an annular cross-section first steel segment having a cup-shaped cavity opening to one end thereof;

providing an annular cross-section second steel segment; and joining said second section coaxially to said first segment at said one end of said first segment to define an internal enclosed cavity therebetween.

2. The method of claim 1 further comprising providing an array of integral external gear teeth on the outer periphery of said first segment.

3. The method of claim 1 wherein said step of joining comprises friction welding.

4. A method for providing an elongated countershaft (124) for a compound transmission (110) comprising:

(a) providing a work piece (200) by the process of:
  (i) providing by forging an annular cross-section first steel segment (204) having a first cup-shaped cavity (218) opening to the rear end thereof;
  (ii) providing by forging an annular cross-section second steel segment (206) having a second cup-shaped cavity (220) opening to the forward end thereof and a third cup-shaped cavity (222) opening to the rearward end thereof;
  (iii) joining said forward end of said second segment coaxially at a first welded joint (210) to said rearward end of said first segment to define a first enclosed internal cavity (214) therebetween;
  (iv) providing an annular cross-section third steel segment (208) having a forward end; and
  (v) joining said forward end of said third segment coaxially at a second welded joint (212) to said rearward end of said second segment to define a second enclosed internal cavity (216) therebetween; and (b) finish machining said work piece.

5. The method of claim 4 wherein said third segment is formed from a length of steel bar stock.

6. The method of claim 4 further comprising providing an array of integral external gear teeth on the outer periphery of said first segment.

7. The method of claim 5 further comprising providing an array of integral external gear teeth on the outer periphery of said first segment.

8. The method of claim 4 wherein said joining of steps (iii) and (v) comprises friction welding.

* * * * *